United States Patent
Wade et al.

(10) Patent No.: US 10,018,458 B2
(45) Date of Patent: Jul. 10, 2018

(54) VALIDATING PARTS USING A NUMBER OF CONTIGUOUS COUPONS PRODUCED FROM PART EXCESS

(71) Applicant: The Boeing Company, Chicago, IL (US)

(72) Inventors: Daniel John Wade, Carbonado, WA (US); Micah Barrett Fuller, Lacey, WA (US); Keith A. Walton, Kent, WA (US); Alan A. Johnson, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 115 days.

(21) Appl. No.: 15/262,874

(22) Filed: Sep. 12, 2016

(65) Prior Publication Data

US 2018/0073851 A1    Mar. 15, 2018

(51) Int. Cl.
*G01B 3/34* (2006.01)
*G01B 5/12* (2006.01)
*G01B 5/02* (2006.01)

(52) U.S. Cl.
CPC ............... *G01B 5/12* (2013.01); *G01B 5/02* (2013.01)

(58) Field of Classification Search
CPC ... G01B 5/02; G01B 5/28; G01B 3/42; G01B 3/34
USPC .... 33/1 BB, 501, 542, 543, 544.5, 545, 546, 33/550, 551
See application file for complete search history.

(56) References Cited

U.S. PATENT DOCUMENTS

| 8,365,429 | B2* | 2/2013 | Lawrence | G01N 3/08 33/529 |
|---|---|---|---|---|
| 8,371,036 | B2* | 2/2013 | Lawrence | G01N 3/08 33/529 |
| 2003/0126753 | A1* | 7/2003 | Barefoot | B23K 9/00 33/501.45 |
| 2004/0045180 | A1* | 3/2004 | Barefoot | B23K 9/00 33/501.45 |
| 2015/0020396 | A1* | 1/2015 | Kane | G01B 5/00 33/561.1 |
| 2015/0033570 | A1* | 2/2015 | Bernabe | G01B 3/34 33/555.1 |
| 2015/0226534 | A1* | 8/2015 | Rodriguez | G01B 3/38 33/501.45 |
| 2017/0082415 | A1* | 3/2017 | O'Hara | G01B 5/12 |

OTHER PUBLICATIONS

"Leica Absolute Tracker AT901," Product Brochure, copyright 2012 Hexagon Metrology, Part of Hexagon, Printed in Germany, Feb. 2013, 12 pages. http://www.aicon3d.com/fileadmin/user_upload/produkte/en/moveinspect/Leica/Leica_Absolute_Tracker_AT901_brochure_en.pdf.

\* cited by examiner

*Primary Examiner* — G. Bradley Bennett
(74) *Attorney, Agent, or Firm* — Yee & Associates, P.C.

(57) ABSTRACT

A method and a check fixture is presented. A part having a number of contiguous coupons is processed using an automated tool. Geometry of the number of contiguous coupons is inspected to produce inspection results. The part is validated using the inspection results.

22 Claims, 14 Drawing Sheets

VALIDATING PARTS USING A NUMBER OF CONTIGUOUS COUPONS PRODUCED FROM PART EXCESS

BACKGROUND INFORMATION

1. Field

The present disclosure relates generally to validating parts, and more specifically, to validating parts without computer-aided metrology. Still more particularly, the present disclosure relates to validating parts using inspection results from inspecting a number of contiguous coupons using a check fixture.

2. Background

Currently, automatically machined parts are validated for dimensional conformance using computer-aided metrology. For example, some automatically machined parts are validated using laser tracking data. However, performing and analyzing inspections from laser tracking equipment for each automatically machined part adds an undesirably large amount of time to manufacturing. A large number of laser tracking set-ups may be present to accommodate inspecting each automatically machined part. The floor space dedicated to laser tracking equipment may be undesirably large. Therefore, it would be desirable to have a method and apparatus that take into account at least some of the issues discussed above, as well as other possible issues.

SUMMARY

In one illustrative embodiment, a method is presented. A part having a number of contiguous coupons is processed using an automated tool. Geometry of the number of contiguous coupons is inspected to produce inspection results. The part is validated using the inspection results.

In another illustrative embodiment, a method is presented. A part having an excess is processed using an automated tool to form a processed part and a number of contiguous coupons having representative part features. The number of contiguous coupons is separated from the processed part. The representative part features of the number of contiguous coupons are inspected to produce inspection results. A determination is made to see if the inspection results are within tolerance. At least one of validating the part using the inspection results if the inspection results are within tolerance or making adjustments to manufacturing factors based on the inspection results if the inspection results are not within tolerance is performed.

In yet another illustrative embodiment, a check fixture for validation of geometric features of a part is presented. The check fixture comprises a plurality of check locations for physical verification of geometry of a number of contiguous coupons processed with the part. The plurality of check locations validates a plurality of representative part features.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

The different illustrative embodiments recognize and take into account one or more different considerations. For example, the illustrative embodiments recognize and take into account that manual measurement may be at least one of less time consuming or less costly than laser metrology. Further, the illustrative embodiments recognize and take into account that performing manual measurements of parts may have lower measurement accuracy than laser metrology. Yet further, the illustrative embodiments recognize and take into account that training operators to perform measurements and validations of different designs of many parts may be more complicated than desired.

Figure 1:
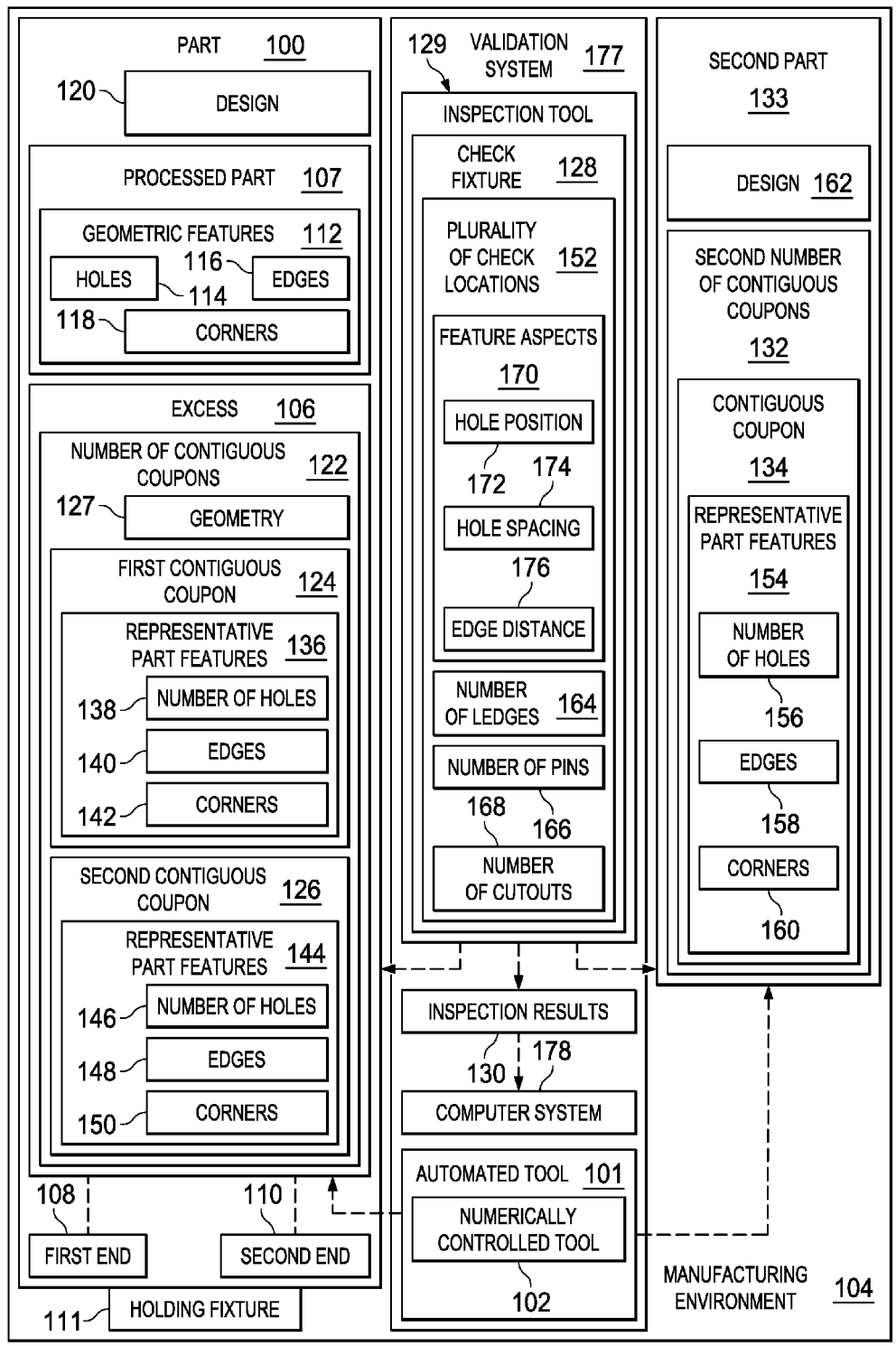
FIG. 1 is an illustration of a block diagram of a manufacturing environment in accordance with an illustrative embodiment.

Referring now to the figures and, in particular, with reference to FIG. 1, an illustration of a block diagram of a manufacturing environment is depicted in accordance with an illustrative embodiment. Part 100 is processed using automated tool 101 within manufacturing environment 104. In some illustrative examples, automated tool 101 is numerically controlled tool 102. Part 100 includes excess 106. Excess 106 may be extra material that would conventionally be removed from processed part 107. Excess 106 may include extra material on at least one of first end 108 of part 100 or second end 110 of part 100.

As used herein, the phrase "at least one of," when used with a list of items, means different combinations of one or more of the listed items may be used, and only one of each item in the list may be needed. In other words, "at least one of" means any combination of items or number of items may be used from the list but not all of the items in the list are required. The item may be a particular object, a thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; or other suitable combinations.

Prior to processing part 100, part 100 is placed onto holding fixture 111. Part 100 is indexed to holding fixture 111 prior to running a processing program on automated tool 101. Part 100 is indexed using any desirable indexing features, such as holes, index markings, tabs, or any other indexing method.

The processing program for automated tool 101 includes instructions for forming processed part 107. Geometric features 112 of processed part 107 are formed in part 100. Geometric features 112 may include at least one of holes 114, edges 116, or corners 118. Holes 114 may have any desirable dimension. For example, holes 114 may have any desirable diameter or depth. Holes 114 may include any desirable number of holes. In some examples, holes 114 include holes of the same dimensions. In other examples, holes 114 may include holes with differing dimensions. For example, at least one hole of holes 114 may have a different diameter, countersink diameter, depth, or other dimensions.

Edges 116 may have any desirable shape or dimension. For example, edges 116 may be straight, curved, or any other desirable shape. Further, edges 116 may be any desirable length or thickness.

Corners 118 may have any desirable shape or dimension. For example, corners 118 may be rounded or pointed. Part 100 has design 120. Design 120 may include desirable locations for geometric features 112.

The processing program for automated tool 101 also includes instructions for forming number of contiguous coupons 122 in excess 106. As used herein, "a number of," when used with reference to items means one or more items. For example, "number of contiguous coupons 122" includes one or more contiguous coupons. Number of contiguous coupons 122 is connected to processed part 107 and may be removed from processed part 107 after automated tool 101 has formed geometric features 112.

As depicted, number of contiguous coupons 122 includes first contiguous coupon 124 and second contiguous coupon 126. First contiguous coupon 124 may be on first end 108 of part 100 while second contiguous coupon 126 may be on second end 110 of part 100.

Geometry 127 of number of contiguous coupons 122 is inspected to form inspection results 130. Inspection tool 129 is configured to inspect geometry 127 of number of contiguous coupons 122. Geometry 127 of number of contiguous coupons 122 includes at least one of representative part features 136 or representative part features 144.

In some illustrative examples, number of contiguous coupons 122 may be physically inspected using check fixture 128. In other illustrative examples, geometry 127 of number of contiguous coupons 122 may be inspected using any desirable methods or tools. Inspection results 130 may be used to validate part 100.

Rather than inspecting processed part 107 directly, inspection results 130 from number of contiguous coupons 122 are attributed to processed part 107. When inspection results 130 are within tolerances, processed part 107 is validated. When inspection results 130 are outside of tolerances, processed part 107 is not validated and additional actions may be taken. These additional actions may include at least one of direct inspection of processed part 107 or adjusting manufacturing factors.

Because all of part 100, including number of contiguous coupons 122 and processed part 107, are processed using the same controls and automated tool 101, inspection results 130 from at least one of representative part features 136 or representative part features 144 of number of contiguous coupons 122 formed using automated tool 101 may be used to validate all of part 100. By having first contiguous coupon 124 on first end 108 and second contiguous coupon 126 on second end 110, functioning of automated tool 101 along the length of part 100 may be validated.

In some illustrative examples, number of contiguous coupons 122 may have more or less than two contiguous coupons. For example, second number of contiguous coupons 132 of second part 133 only includes contiguous coupon 134. In other examples, part 100 or another part in manufacturing environment 104 may have more than two contiguous coupons.

First contiguous coupon 124 has representative part features 136. Representative part features 136 include at least one of number of holes 138, edges 140, or corners 142. In some illustrative examples, representative part features 136 may be representative of geometric features 112. For example, dimensions of representative part features 136 may have the same dimensions as geometric features 112. For example, at least one hole of holes 114 may have the same dimensions as at least one hole of number of holes 138. In another example, hole spacing of holes 114 may be the same as hole spacing for number of holes 138. In yet another example, at least one corner of corners 118 may have the same dimensions as at least one corner of corners 142.

Number of holes 138 may have any desirable dimensions. In some examples, number of holes 138 has different dimensions than holes 114. For example, number of holes 138 may have any desirable diameter or depth. Number of holes 138 may include any desirable number of holes. In some examples, number of holes 138 includes holes of the same dimensions. In other examples, number of holes 138 may include holes with differing dimensions.

Edges 140 may have any desirable shape or dimension. For example, edges 140 may be straight, curved, or any other desirable shape. Further, edges 140 may be any desirable length or thickness.

Corners 142 may have any desirable shape or dimension. For example, corners 142 may be rounded or pointed.

Representative part features 136 may be selected and designed to fit within excess 106 based on design 120 of part 100. Representative part features 136 may be selected to inspect a desirable number of types and axes of motion of automated tool 101. In some illustrative examples, representative part features 136 may be selected and designed to fit within an excess of a plurality of different designs of parts. In these illustrative examples, representative part features 136 may be universal part features for contiguous coupons for a plurality of designs of parts.

Second contiguous coupon 126 has representative part features 144. Representative part features 144 include at least one of number of holes 146, edges 148, or corners 150. Each of number of holes 146, edges 148, and corners 150 may have any desirable dimension or location.

In some illustrative examples, first contiguous coupon 124 and second contiguous coupon 126 have the same design. In these illustrative examples, representative part features 144 and representative part features 136 are the same. By having representative part features 144 and representative part features 136 be the same, both first contiguous coupon 124 and second contiguous coupon 126 may be physically inspected on the same locations of check fixture 128.

When first contiguous coupon 124 and second contiguous coupon 126 are different, plurality of check locations 152 may have a greater quantity of locations. For example, some locations may be specific to first contiguous coupon 124 while other locations are specific to second contiguous coupon 126. By having representative part features 144 and representative part features 136 be the same, a quantity for plurality of check locations 152 of check fixture 128 may be reduced.

When first contiguous coupon 124 and second contiguous coupon 126 are different, each may be physically inspected by a different check fixture. By having plurality of check locations 152 used by both first contiguous coupon 124 and second contiguous coupon 126, physically inspecting number of contiguous coupons 122 may be simplified by using the same check fixture.

Contiguous coupon 134 has representative part features 154. Representative part features 154 may include at least one of number of holes 156, edges 158, or corners 160. In some illustrative examples, contiguous coupon 134 may have the same design as first contiguous coupon 124 and second contiguous coupon 126. In some illustrative examples, contiguous coupon 134 may have the same design as first contiguous coupon 124 and second contiguous coupon 126 despite design 120 of part 100 being different from design 162 of second part 133.

Check fixture 128 may be used for validation of geometric features of a part, such as geometric features 112 of part 100. Check fixture 128 comprises plurality of check locations 152 for physical inspection of geometry 127 of number of contiguous coupons 122 processed with part 100, wherein plurality of check locations 152 inspects a plurality of representative part features 136.

Plurality of check locations 152 comprises at least one of number of ledges 164, number of pins 166, or number of cutouts 168. Plurality of check locations 152 is used to verify features aspects 170 including hole position 172, hole spacing 174, and edge distance 176.

In some examples, plurality of check locations 152 comprises a cutout for verifying an outer dimension of number of contiguous coupons 122. The cutout is one of number of cutouts 168. The outer dimensions include at least one corner and at least one edge of a contiguous coupon of number of contiguous coupons 122.

In some examples, plurality of check locations 152 comprises a pin configured to verify a hole position of number of contiguous coupons 122. The pin is one of number of pins 166. In one illustrative example, the hole position is a position of a hole of number of holes 138 of first contiguous coupon 124. In another example, the hole position is a hole of number of holes 146 of second contiguous coupon 126.

In some examples, plurality of check locations 152 comprises a ledge configured to verify a hole position of number of contiguous coupons 122. The ledge is one of number of ledges 164. In one illustrative example, the hole position is a position of number of holes 138 of first contiguous coupon 124. In another example, the hole position is a position of number of holes 146 of second contiguous coupon 126.

In some examples, plurality of check locations 152 comprises pins configured to verify hole spacing of number of contiguous coupons 122. For example, number of pins 166 may be configured to verify spacing of number of holes 138 of first contiguous coupon 124. In another example, number of pins 166 may be configured to verify spacing of number of holes 146 of second contiguous coupon 126.

Based on inspection results 130, processed part 107 may be validated. Processed part 107 may be validated using validation system 177. Validation system 177 includes automated tool 101 configured to process part 100 having number of contiguous coupons 122, inspection tool 129 configured to inspect geometry 127 of number of contiguous coupons 122 to produce inspection results 130, and computer system 178 configured to validate part 100 using the inspection results 130.

Inspection results 130 from geometry 127 of number of contiguous coupons 122 may be attributed to processed part 107 because both number of contiguous coupons 122 and processed part 107 are automatically produced using automated tool 101. In some illustrative examples, inspection results 130 may be used to validate more than one part. For example, inspection results 130 may be used to validate a preset number of parts in an inspection sampling plan. In an inspection sampling plan, a designated quantity of parts processed at least one of before or after part 100 are validated by inspection results 130.

When one of number of contiguous coupons 122 fails an inspection of check fixture 128, inspection results 130 are not used to validate processed part 107. When one of number of contiguous coupons 122 fails an inspection of check fixture 128, inspection results 130 are not within tolerance. When inspection results 130 are not within tolerance, manufacturing factors are adjusted. The manufacturing factors include at least one of the processing program for automated tool 101, holding fixture 111, or placement of part 100 on holding fixture 111.

The illustrations of part 100 and check fixture 128 in FIG. 1 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although only check fixture 128 is depicted in manufacturing environment 104, several check fixtures may be present in manufacturing environment 104. For example, a plurality of identical check fixtures may be present in manufacturing environment 104 to physically inspect contiguous coupons from a plurality of parts. By having a plurality of identical check fixtures, physically inspecting the contiguous coupons may not be a bottleneck in the manufacturing time for the parts.

Further, although first contiguous coupon 124 is described as having representative part features 136, these features may not be representative of geometric features 112. In some examples, representative part features 136 may not resemble geometric features 112. For example, holes 114 may have different dimensions than number of holes 138. In these illustrative examples, representative part features 136 may be universal part features for contiguous coupons for a plurality of designs of parts.

Yet further, in some examples, rather than using check fixture 128, geometry 127 of number of contiguous coupons 122 is inspected using other tools or methods. For example, inspection tool 129 may be one of calipers, a protractor, or a laser inspection tool. Thus, geometry 127 of number of contiguous coupons 122 may be inspected using calipers, protractors, or other desirable metrology tools.

Additionally, although part 100 is described as processed by automated tool 101, automated tool 101 may take the form of numerically controlled tool 102. Each process described above may be described as being performed by numerically controlled tool 102.

Figure 2:
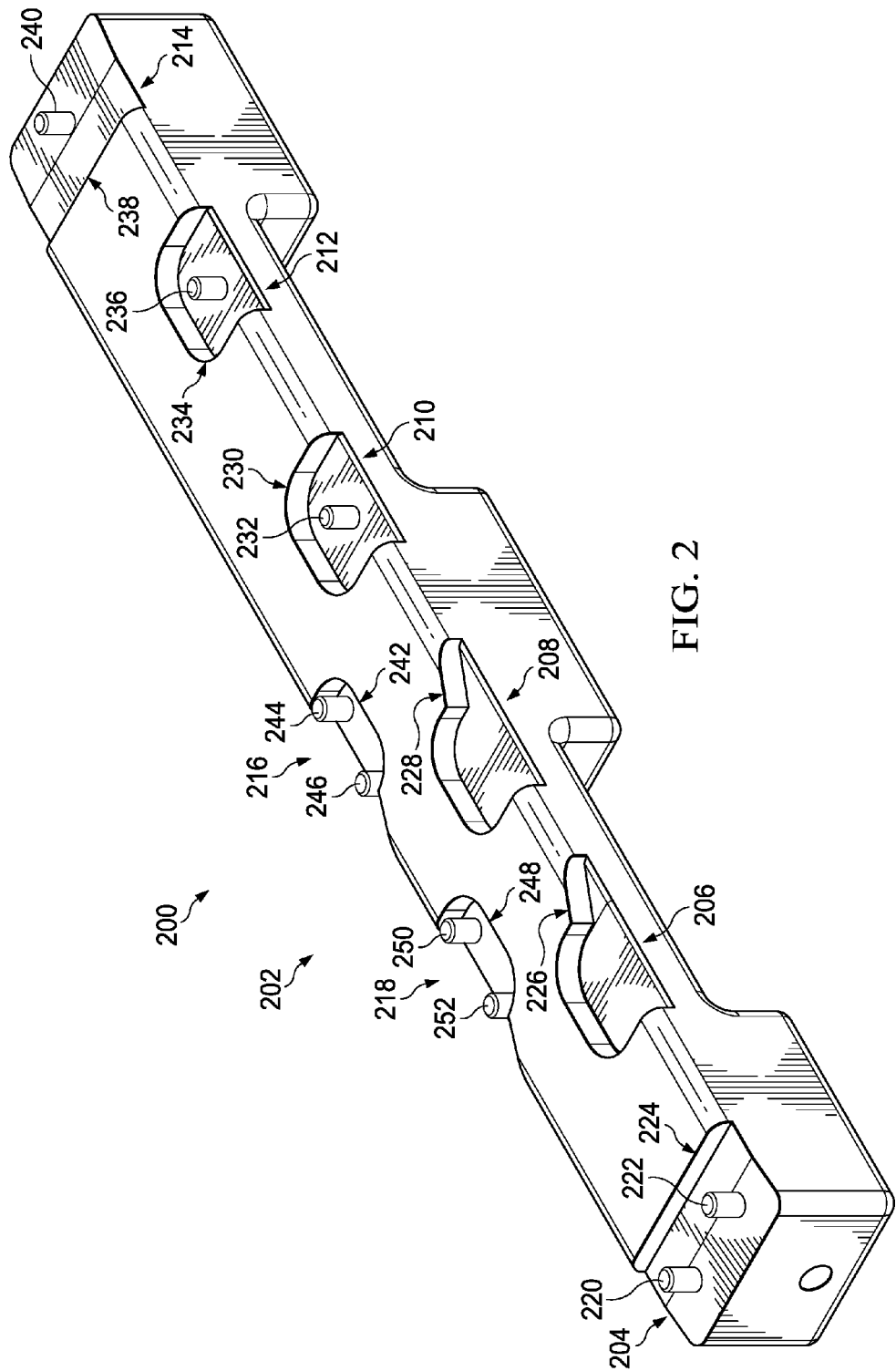
FIG. 2 is an illustration of a check fixture in accordance with an illustrative embodiment.

Turning now to FIG. 2, an illustration of a check fixture is depicted in accordance with an illustrative embodiment. Check fixture 200 is a physical implementation of check fixture 128 of FIG. 1.

Check fixture 200 may be used to verify dimensions of a contiguous coupon, such as first contiguous coupon 124 of FIG. 1. Check fixture 200 has plurality of check locations 202. Plurality of check locations 202 includes first location 204, second location 206, third location 208, fourth location 210, fifth location 212, sixth location 214, seventh location 216, and eighth location 218.

First location 204 includes pin 220, pin 222, and ledge 224. Second location 206 includes cutout 226. Third location 208 includes cutout 228. Fourth location 210 includes cutout 230 and pin 232. Fifth location 212 includes cutout 234 and pin 236. Sixth location 214 includes ledge 238 and pin 240. Seventh location 216 includes cutout 242, pin 244, and pin 246. Eighth location 218 includes cutout 248, pin 250, and pin 252.

As depicted, plurality of check locations 202 of check fixture 200 has eight check locations. (The eight check locations are used to verify movement of a numerically controlled tool in all axes and rotations. More specifically, the eight check locations of plurality of check locations 202 are used to verify movement of a numerically controlled tool in 5 axes of movement. In other illustrative examples, a check fixture may have more or less than eight check locations. If a numerically controlled tool uses fewer axes or fewer rotations, check fixture 200 may have fewer check locations to validate processed parts.

Check fixture 200 may be formed of any desirable material or combination of materials. The material for check fixture 200 may be selected based on at least one of availability, ease of machining, stability of shape after machining, or tolerance of machining in the material. In some illustrative examples, at least a portion of check fixture 200 is formed from aluminum or an aluminum alloy. In some illustrative examples, the pins, such as pin 220, pin 222, pin 232, pin 236, pin 240, pin 244, pin 246, pin 250, and pin 252 are formed of steel.

The locations and diameters of the pins may be independent for each check location of plurality of check locations 202. For example, the diameter of pin 232 may be different than the diameter of pin 240 although both pin 232 and pin 240 are designed to interact with the same hole of a contiguous coupon.

The diameter and location of the pins for each location are selected based on the desired physical inspection for the respective check location. For example, fourth location 210 inspects for a hole position with maximum size while fifth location 212 inspects for a hole position with minimum size. Pin 232 may have at least one of a different diameter or a different location than pin 236. The diameter and location of the pins for each location are also selected based on the allowable manufacturing tolerance for the contiguous coupon.

Figure 3:
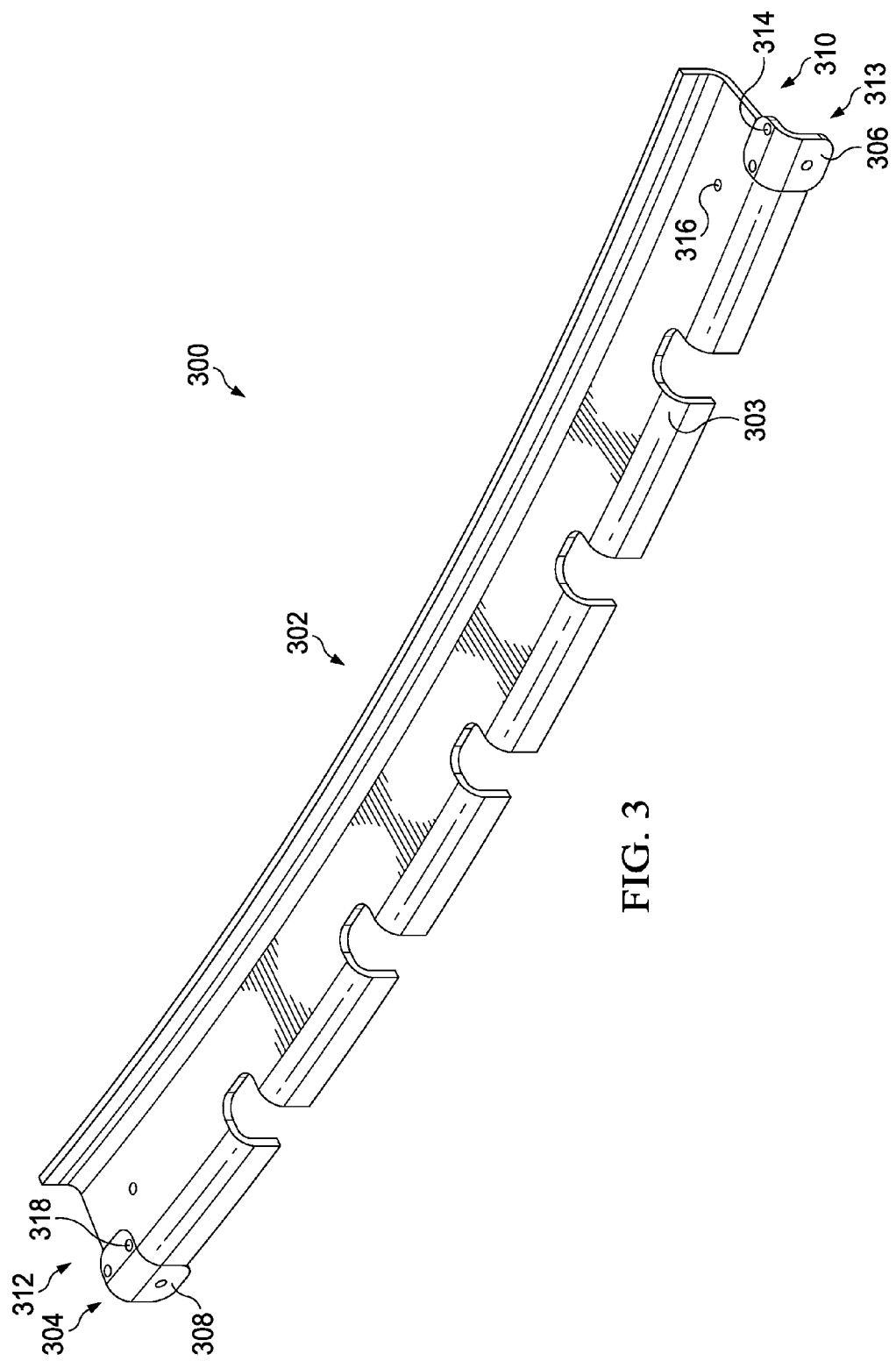
FIG. 3 is an illustration of a processed part and a contiguous coupon in accordance with an illustrative embodiment.

Turning now to FIG. 3, an illustration of a processed part and a contiguous coupon is depicted in accordance with an illustrative embodiment. Part 300 includes excess 302. Part 300 may be a physical implementation of part 100 of FIG. 1. In this illustrative example, part 300 has been processed to form processed part 303. Processed part 303 may be a physical implementation of processed part 107 of FIG. 1.

Excess 302 of part 300 has been processed to form number of contiguous coupons 304. Number of contiguous coupons 304 may be a physical implementation of number of contiguous coupons 122 of FIG. 1. Processed part 303 and number of contiguous coupons 304 are automatically produced using an automated tool, such as numerically controlled tool 102 of FIG. 1. Offsets for the numerically controlled tool will be evidenced in processed part 303 and number of contiguous coupons 304.

Number of contiguous coupons 304 includes first contiguous coupon 306 and second contiguous coupon 308. First contiguous coupon 306 is positioned on first end 310 of part 300. Second contiguous coupon 308 is positioned on second end 312 of part 300.

Number of contiguous coupons 304 may be separated from processed part 303. After separating number of contiguous coupons 304 from processed part 303, geometry of number of contiguous coupons 304 may be inspected. Inspection data from inspecting the geometry of number of contiguous coupons 304, is attributed to processed part 303. In some examples, number of contiguous coupons 304 may be physically inspected using a check fixture, such as check fixture 200 of FIG. 2. In other examples, the geometry of number of contiguous coupons 304 may be inspected using calipers, protractors, or any desirable equipment or process. In some illustrative examples, the desirable method or equipment includes automated inspection equipment such as sensors, laser scanners, or other automated inspection equipment. Number of contiguous coupons 304 is smaller than processed part 303. Inspecting number of contiguous coupons 304 using automated inspection equipment may take less time than inspecting processed part 303 using automated inspection equipment.

In some illustrative examples, inspection of number of contiguous coupons 304 is part of an inspection sampling process. In conventional inspection sampling, not all parts are inspected. Instead, in conventional inspection sampling, a subset of parts is inspected to determine if the parts are within tolerance. The results are applied to parts manufactured at least one of before or after the inspected part.

In one illustrative example, number of contiguous coupons 304 may be used to validate more than just part 300. In this illustrative example, number of contiguous coupons 304 may be used to validate a quantity of parts processed by the same automated tool at least one of before or after processing of part 300 by the automated tool.

Although this illustrative example depicts two contiguous coupons, any desirable number of contiguous coupons may be connected to processed part 303. In some illustrative examples, there may be only a single contiguous coupon on first end 310 of part 300. In other illustrative examples, there may be only a single contiguous coupon on second end 312 of part 300. In yet other illustrative examples, there may be additional contiguous coupons.

As depicted, first contiguous coupon 306 and second contiguous coupon 308 have the same design. In other illustrative examples, first contiguous coupon 306 and second contiguous coupon 308 may have different designs. When first contiguous coupon 306 and second contiguous coupon 308 have different designs, they may be inspected on at least one of different check locations of the same check fixture or a different check fixture.

Representative part features 313 of first contiguous coupon 306 are selected for first contiguous coupon 306 to fit within the portion of excess 302 at first end 310 of part 300. Representative part features 313 of first contiguous coupon 306 are also selected to verify a desired number of axes and rotations of the numerically controlled tool used to process first contiguous coupon 306. The quantity, size, and positioning of representative part features 313 of first contiguous coupon 306 may be selected based on tolerances for processed part 303.

Inspection of representative part features 313 is indicative of offset of the numerically controlled tool. Offset of the numerically controlled tool used to form first contiguous coupon 306 affects all of part 300 including both first contiguous coupon 306 and processed part 303.

Representative part features 313 need not be identical to features of processed part 303. However, in some examples, at least one feature of representative part features 313 may be substantially the same as a number of features of processed part 303. By having at least one feature of representative part features 313 substantially the same as a number of features of processed part 303, inspection results from representative part features 313 may be directly applied to features of processed part 303.

As depicted, first contiguous coupon 306 has hole 314 having the same dimensions as hole 316 of processed part 303. Second contiguous coupon 308 has hole 318 having the same dimensions as hole 316 of processed part 303. As a result, inspection results of hole 314 may be directly applicable to hole 316.

Figure 4:
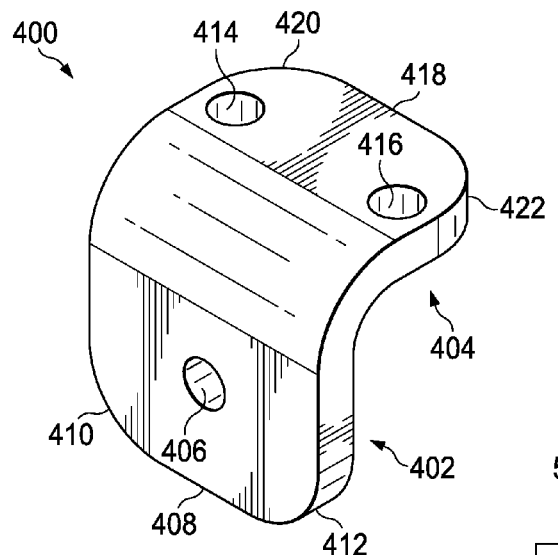
FIG. 4 is an illustration of a contiguous coupon in accordance with an illustrative embodiment.

Turning now to FIG. 4, an illustration of a contiguous coupon is depicted in accordance with an illustrative embodiment. Contiguous coupon 400 may be a physical implementation of at least one of first contiguous coupon 124, second contiguous coupon 126, or contiguous coupon 134 of FIG. 1. Contiguous coupon 400 may be a representation of first contiguous coupon 306 or second contiguous coupon 308 of FIG. 3.

As depicted, contiguous coupon 400 includes flange 402 and flange 404. Flange 402 includes hole 406, edge 408, corner 410, and corner 412. Flange 404 includes hole 414, hole 416, edge 418, corner 420, and corner 422.

Figure 5:
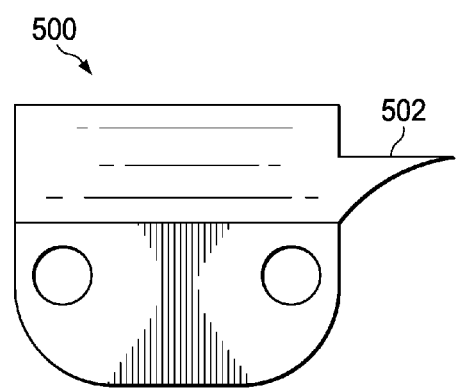
FIG. 5 is an illustration of a contiguous coupon with a tang in accordance with an illustrative embodiment.

Turning now to FIG. 5, an illustration of a contiguous coupon with a tang is depicted in accordance with an illustrative embodiment. Contiguous coupon 500 may be one of number of contiguous coupons 304 after removal from part 300 of FIG. 3. Tang 502 may result from separation of one of number of contiguous coupons 304 from part 300.

Tang 502 may be removed to facilitate verification of contiguous coupon 500 using a check fixture, such as check fixture 200 of FIG. 2. Tang 502 may be removed as along as a nominal machined edge is not altered. Some amount of material of tang 502 may be left on contiguous coupon 500. For example, 0.04 inches to 0.06 inches of material may remain on contiguous coupon 500 without interfering with verification of contiguous coupon 500.

Figure 6:
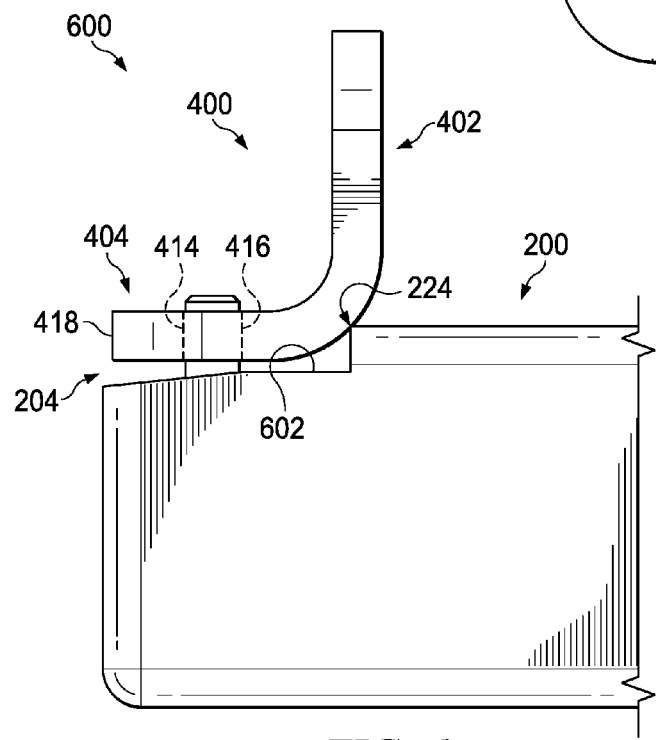
FIG. 6 is an illustration of a contiguous coupon on a first location of a check fixture in accordance with an illustrative embodiment.

Turning now to FIG. 6, an illustration of a contiguous coupon on a first location of a check fixture is depicted in accordance with an illustrative embodiment. View 600 may be a view of contiguous coupon 400 on first location 204 of check fixture 200. As depicted, contiguous coupon 400 is out of tolerance. As depicted, contiguous coupon 400 contacts ledge 224 preventing contiguous coupon 400 from contacting index surface 602. Contiguous coupon 400 contacting ledge 224 indicates out of tolerance hole positions in contiguous coupon 400.

As depicted, first location 204 of check fixture 200 indicates hole position. More specifically, first location 204 of check fixture 200 indicates that locations of hole 414 and hole 416 are out of tolerance within flange 404. Hole 414 and hole 416 are positioned too close to edge 418. Positions of hole 414 and hole 416 cause contiguous coupon 400 to contact ledge 224.

Inspecting contiguous coupon 400 using first location 204 of check fixture 200 forms inspection data. Inspection data is attributed to a processed part that was automatically processed with contiguous coupon 400 by a numerically controlled tool.

In this illustrative example, the inspection data indicates an out of tolerance condition. As a result, an out of tolerance condition is attributed to the processed part.

Figure 7:
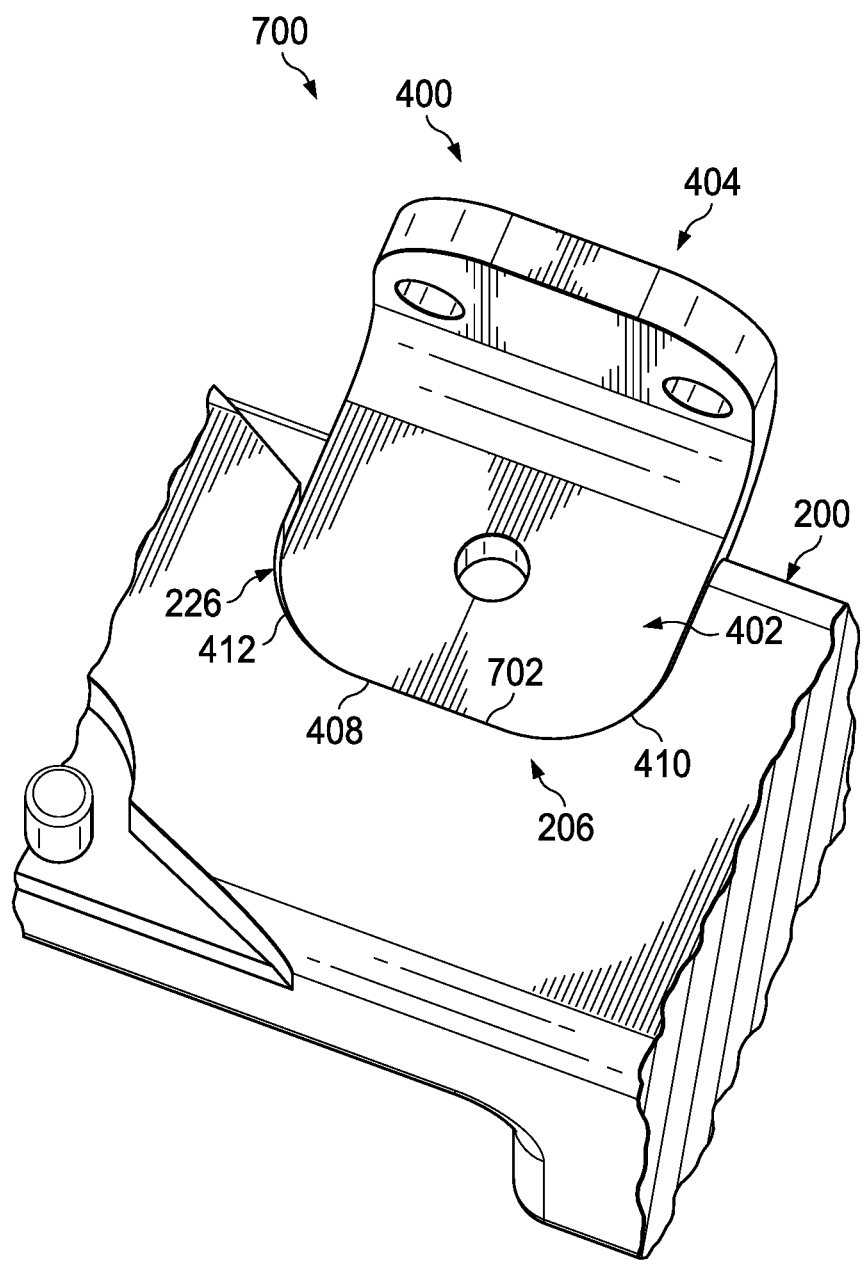
FIG. 7 is an illustration of a contiguous coupon on a second location of a check fixture in accordance with an illustrative embodiment.

Turning now to FIG. 7, an illustration of a contiguous coupon on a second location of a check fixture is depicted in accordance with an illustrative embodiment. View 700 may be a view of contiguous coupon 400 on second location 206 of check fixture 200 of FIG. 2. Second location 206 inspects exterior dimensions. More specifically, second location 206 is used to determine if exterior dimensions of contiguous coupon 400 exceed maximum acceptable dimensions.

As depicted, flange 402 of contiguous coupon 400 is within tolerance. As depicted, flange 402 of contiguous coupon 400 fits within edge 702 of cutout 226.

Inspecting contiguous coupon 400 using second location 206 of check fixture 200 forms inspection data. Inspection data is attributed to a processed part that was automatically processed with contiguous coupon 400 by a numerically controlled tool.

In this illustrative example, the inspection data indicates an in tolerance condition. As a result, an in tolerance condition is attributed to the processed part.

When flange 402 has an out of tolerance condition, edge 408, corner 410, and corner 412 will not fit within edge 702 of cutout 226. If flange 402 had an out of tolerance condition, the out of tolerance condition would also be attributed to the processed part.

Second location 206 does not contain any pins. Pins are used to verify hole position. Without pins, second location 206 is not specific to either flange 402 or flange 404. Second location 206 may be used to verify exterior dimensions of at least one of flange 402 or flange 404.

As depicted, cutout 226 is a cutout for verifying an outer dimension of number of contiguous coupons 122 of FIG. 1. The outer dimension includes edge 408, corner 410, and corner 412 of contiguous coupon 400.

Figure 8:
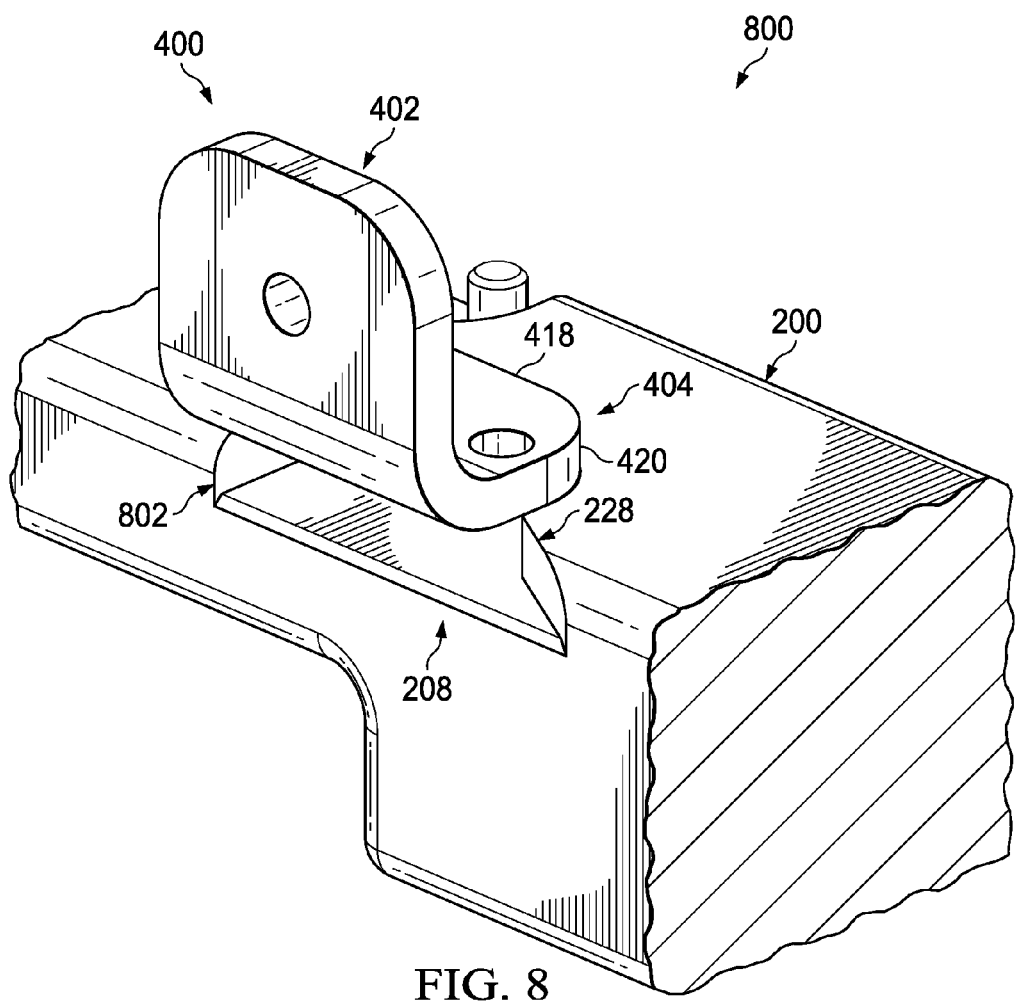
FIG. 8 is an illustration of a contiguous coupon on a third location of a check fixture in accordance with an illustrative embodiment.

Turning now to FIG. 8, an illustration of a contiguous coupon on a third location of a check fixture is depicted in accordance with an illustrative embodiment. View 800 may be a view of contiguous coupon 400 on third location 208 of check fixture 200. Third location 208 inspects exterior dimensions. More specifically, third location 208 is used to determine if exterior dimensions of contiguous coupon 400 meet minimum acceptable dimensions. Third location 208 inspects the least material condition of the trim relative to the flange.

As depicted, flange 404 of contiguous coupon 400 is within tolerance. As depicted, flange 404 of contiguous coupon 400 contacts edge 802 of cutout 228.

Inspecting contiguous coupon 400 using third location 208 of check fixture 200 forms inspection data. Inspection data is attributed to a processed part that was automatically processed with contiguous coupon 400 by a numerically controlled tool.

In this illustrative example, the inspection data indicates an in tolerance condition. As a result, an in tolerance condition is attributed to the processed part.

When flange 404 has an out of tolerance condition, edge 418, corner 420, and corner 422 will fit within edge 802 of cutout 228. If flange 404 had an out of tolerance condition, the out of tolerance condition would also be attributed to the processed part.

Third location 208 does not contain any pins. Pins are used to verify hole position. Without pins, third location 208 is not specific to either flange 402 or flange 404. Third location 208 may be used to verify exterior dimensions of at least one of flange 402 or flange 404.

Figure 9:
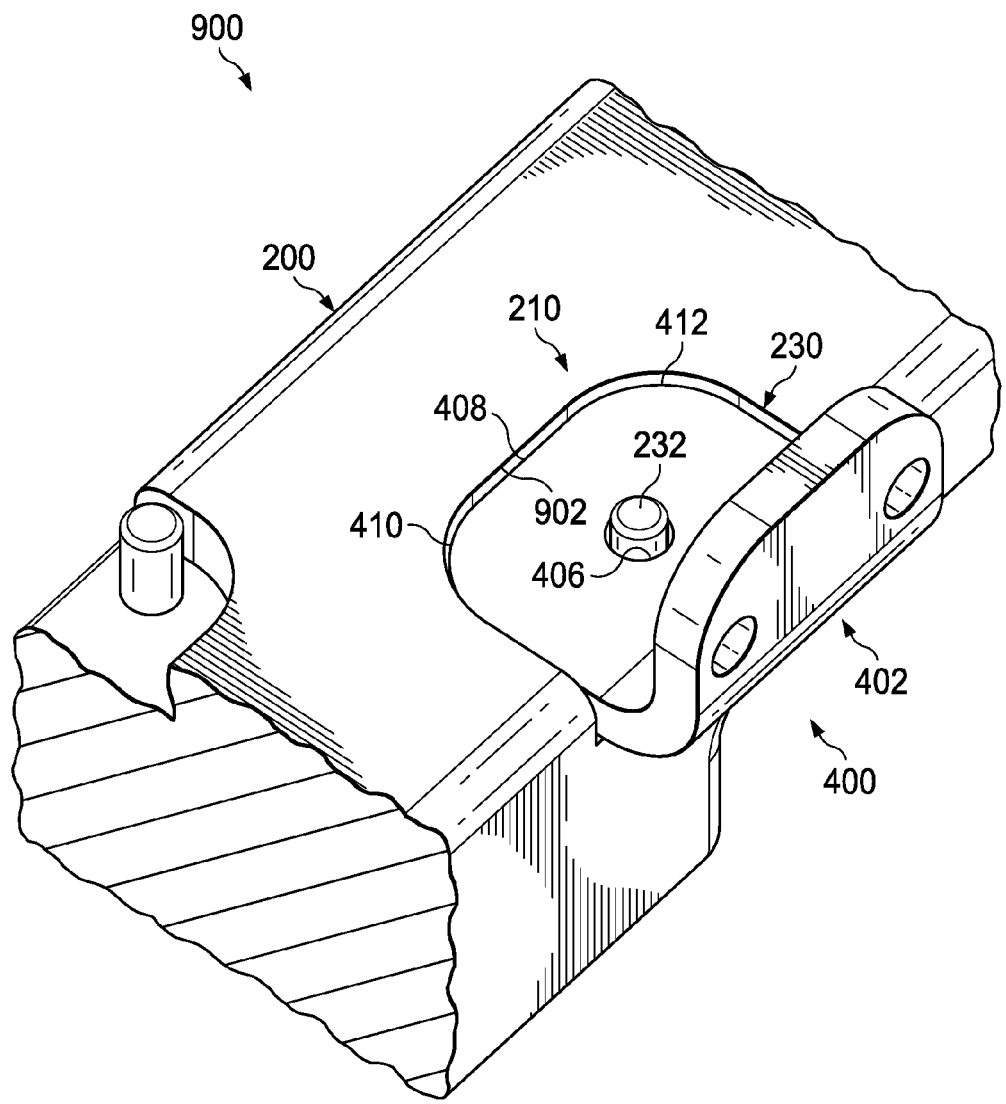
FIG. 9 is an illustration of a contiguous coupon on a fourth location of a check fixture in accordance with an illustrative embodiment.

Turning now to FIG. 9, an illustration of a contiguous coupon on a fourth location of a check fixture is depicted in accordance with an illustrative embodiment. View 900 may be a view of contiguous coupon 400 on fourth location 210 of check fixture 200 of FIG. 2. Fourth location 210 inspects hole position for flange 402 of contiguous coupon 400. As depicted, fourth location 210 is a hole check at maximum material condition.

As depicted, hole 406 of contiguous coupon 400 is within tolerance. When contiguous coupon 400 is within tolerance, hole 406 of contiguous coupon 400 is positioned over pin 232. Pin 232 is used to inspect for hole position for flange 402 of contiguous coupon 400. Contiguous coupon 400 is within tolerance as edge 408, corner 410, and corner 412 fit within edge 902 of cutout 230 of fourth location 210.

Inspecting contiguous coupon 400 using fourth location 210 of check fixture 200 forms inspection data. Inspection data is attributed to a processed part that was automatically processed with contiguous coupon 400 by a numerically controlled tool.

In this illustrative example, the inspection data indicates an in tolerance condition. As a result, an in tolerance condition is attributed to the processed part.

Figure 10:
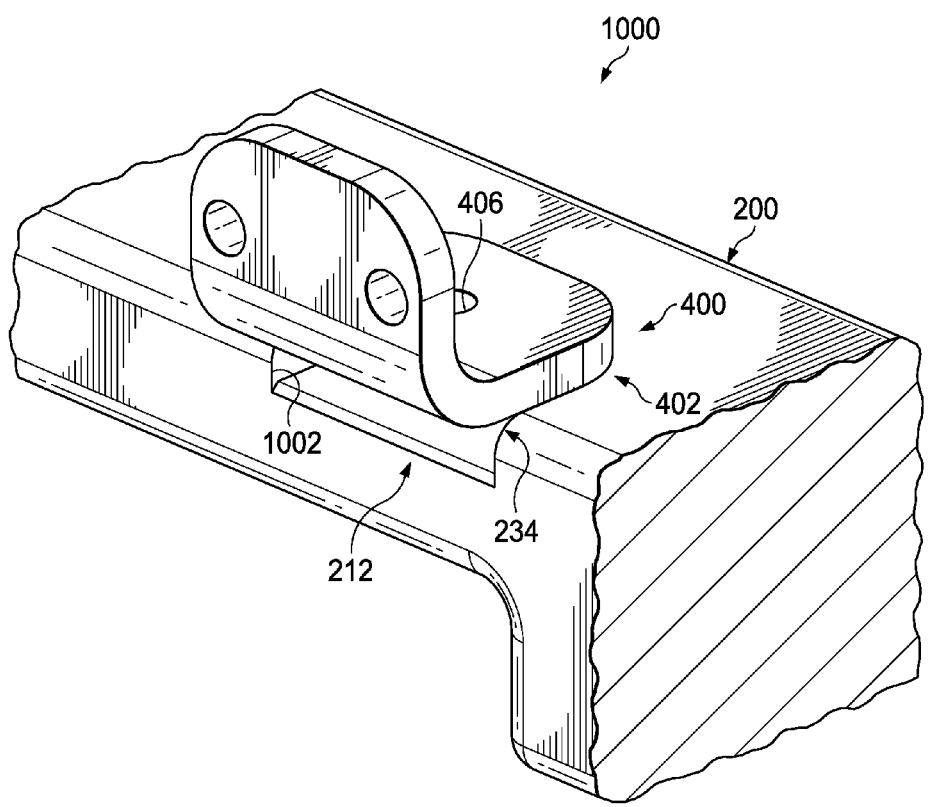
FIG. 10 is an illustration of a contiguous coupon on a fifth location of a check fixture in accordance with an illustrative embodiment.

Turning now to FIG. 10, an illustration of a contiguous coupon on a fifth location of a check fixture is depicted in accordance with an illustrative embodiment. View 1000 may be a view of contiguous coupon 400 on fifth location 212 of check fixture 200. Fifth location 212 inspects hole position for flange 402 of contiguous coupon 400. As depicted, fifth location 212 is a hole check at a minimum material condition. Fifth location 212 measures the least material condition relative to hole 406 of flange 402.

As depicted, contiguous coupon 400 is within tolerance. As depicted, contiguous coupon 400 contacts edge 1002 of cutout 234.

Inspecting contiguous coupon 400 using fifth location 212 of check fixture 200 forms inspection data. Inspection data is attributed to a processed part that was automatically processed with contiguous coupon 400 by a numerically controlled tool.

In this illustrative example, the inspection data indicates an in tolerance condition. As a result, an in tolerance condition is attributed to the processed part.

For contiguous coupons having an out of tolerance condition, a respective hole would fit over pin 236 of FIG. 2 with the edge and corners positioned within edge 1002 of cutout 234. If flange 402 had an out of tolerance condition, the out of tolerance condition would also be attributed to the processed part.

Figure 11:
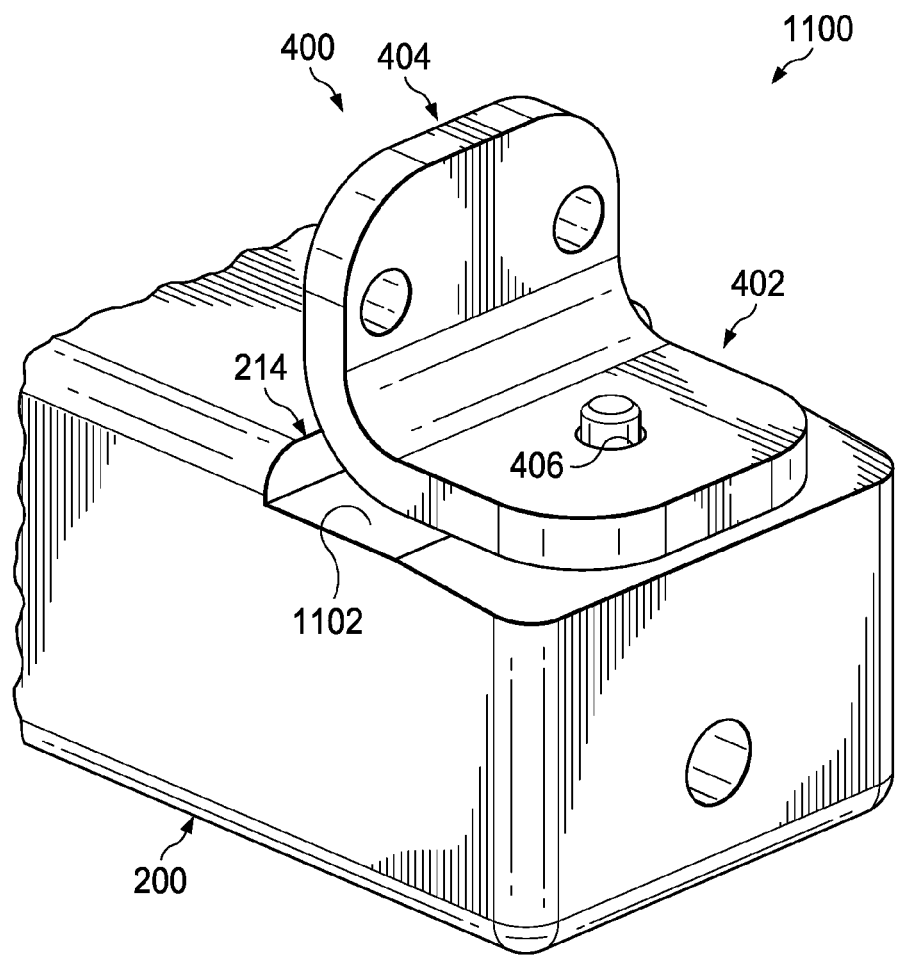
FIG. 11 is an illustration of a contiguous coupon on a sixth location of a check fixture in accordance with an illustrative embodiment.

Turning now to FIG. 11, an illustration of a contiguous coupon on a sixth location of a check fixture in accordance with an illustrative embodiment. View 1100 may be a view of contiguous coupon 400 on sixth location 214 of check fixture 200. As depicted, contiguous coupon 400 is within tolerance. As depicted, contiguous coupon 400 contacts index surface 1102. Contiguous coupon 400 contacting index surface 1102 indicates hole 406 is desirably located in contiguous coupon 400.

Inspecting contiguous coupon 400 using sixth location 214 of check fixture 200 forms inspection data. Inspection data is attributed to a processed part that was automatically processed with contiguous coupon 400 by a numerically controlled tool.

In this illustrative example, the inspection data indicates an in tolerance condition. As a result, an in tolerance condition is attributed to the processed part.

As depicted, sixth location 214 of check fixture 200 indicates hole position. More specifically, sixth location 214 of check fixture 200 indicates that hole 406 is desirably located within flange 402 relative to flange 404.

Figure 12:
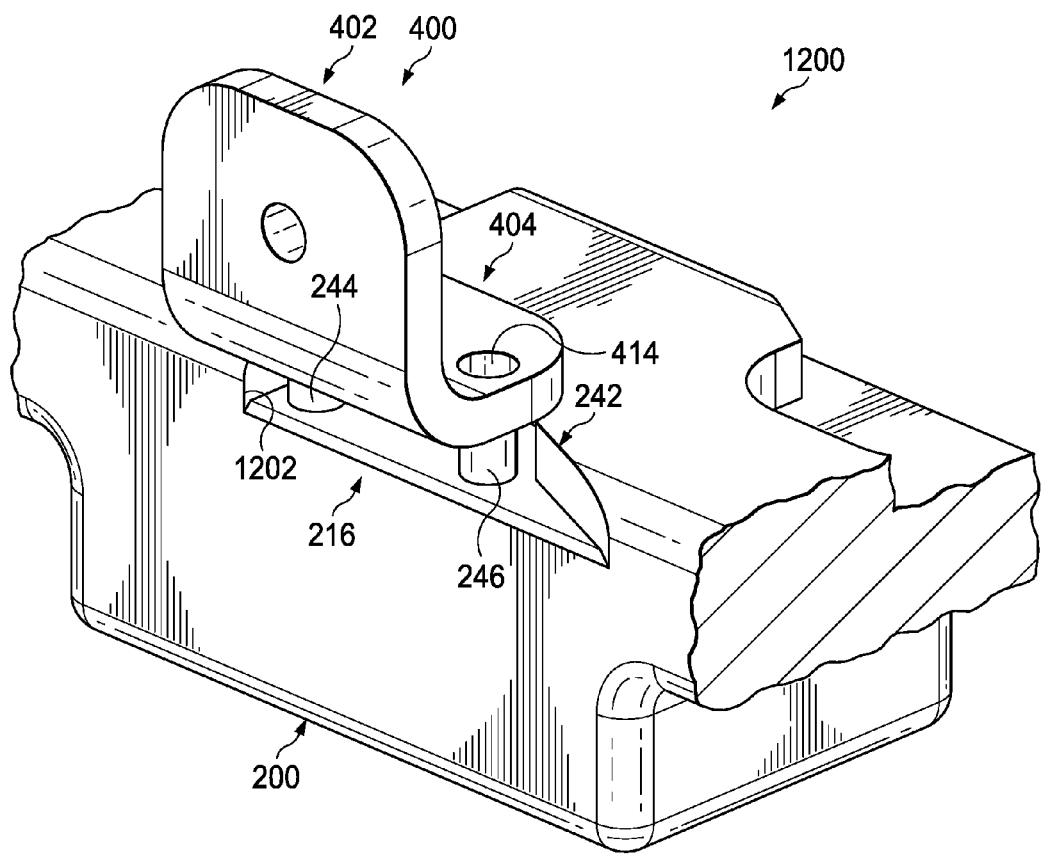
FIG. 12 is an illustration of a contiguous coupon on a seventh location of a check fixture in accordance with an illustrative embodiment.

Turning now to FIG. 12, an illustration of a contiguous coupon on a seventh location of a check fixture is depicted in accordance with an illustrative embodiment. View 1200 may be a view of contiguous coupon 400 on seventh location 216 of check fixture 200. Seventh location 216 inspects hole position for flange 404 of contiguous coupon 400. As depicted, seventh location 216 is a hole check at a minimum material condition. Seventh location 216 measures the least material condition relative to hole 414 and hole 416 of flange 404.

As depicted, contiguous coupon 400 is within tolerance. As depicted, contiguous coupon 400 contacts edge 1202 of cutout 242.

Inspecting contiguous coupon 400 using seventh location 216 of check fixture 200 forms inspection data. Inspection data is attributed to a processed part that was automatically processed with contiguous coupon 400 by a numerically controlled tool.

In this illustrative example, the inspection data indicates an in tolerance condition. As a result, an in tolerance condition is attributed to the processed part.

For contiguous coupons having an out of tolerance condition, a respective hole would fit over each of pin 244 and pin 246 with the edge and corners positioned within edge 1202 of cutout 242. If flange 404 had an out of tolerance condition, the out of tolerance condition would also be attributed to the processed part.

Figure 13:
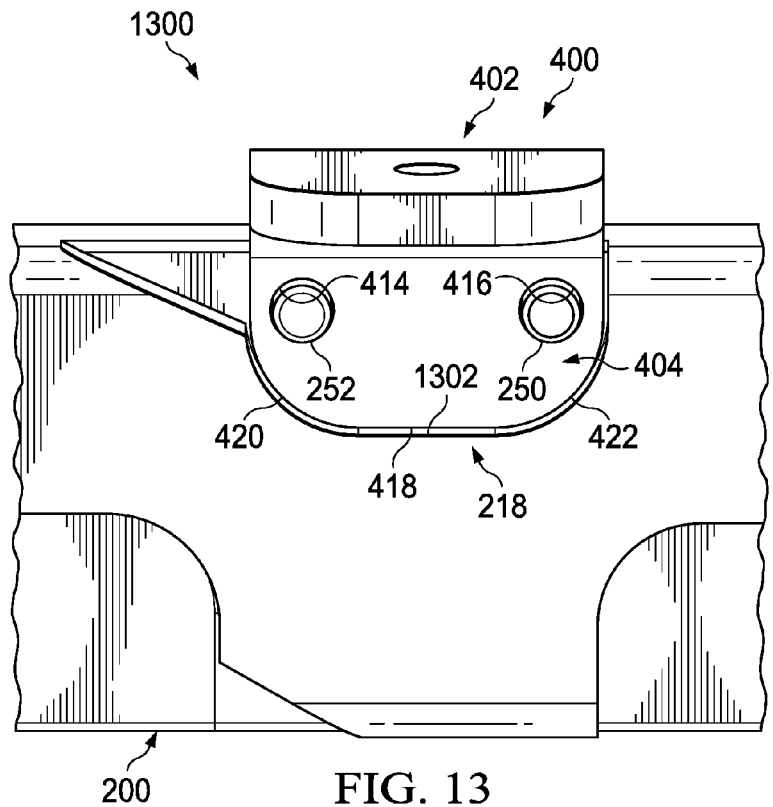
FIG. 13 is an illustration of a contiguous coupon on an eighth location of a check fixture in accordance with an illustrative embodiment.

Turning now to FIG. 13, an illustration of a contiguous coupon on an eighth location of a check fixture is depicted in accordance with an illustrative embodiment. View 1300 may be a view of contiguous coupon 400 on eighth location 218 of check fixture 200. Eighth location 218 inspects hole position for flange 402 of contiguous coupon 400. As depicted, eighth location 218 is a hole check at maximum material condition.

As depicted, hole 414 and hole 416 of contiguous coupon 400 are within tolerance. When contiguous coupon 400 is within tolerance, hole 414 and hole 416 of contiguous coupon 400 are positioned over pin 252 and pin 250 respectively. Contiguous coupon 400 is within tolerance as edge 418, corner 420, and corner 422 fit within edge 1302 of eighth location 218.

Inspecting contiguous coupon 400 using eighth location 218 of check fixture 200 forms inspection data. Inspection data is attributed to a processed part that was automatically processed with contiguous coupon 400 by a numerically controlled tool.

In this illustrative example, the inspection data indicates an in tolerance condition. As a result, an in tolerance condition is attributed to the processed part.

Figure 14:
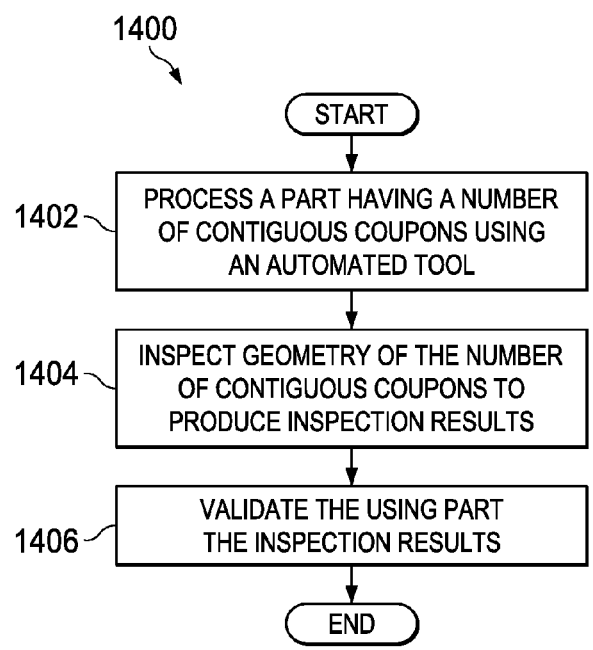
FIG. 14 is an illustration of a flowchart of a process for validating a part in accordance with an illustrative embodiment.

Turning now to FIG. 14, an illustration of a flowchart of a process for validating a part is depicted in accordance with an illustrative embodiment. Process 1400 may be used to validate part 100 of FIG. 1 or part 300 of FIG. 3.

Process 1400 processes a part having a number of contiguous coupons using an automated tool (operation 1402). In some illustrative examples, processing the part having the number of contiguous coupons includes creating a number of holes in the number of contiguous coupons. In some illustrative examples, the number of contiguous coupons comprises a first part coupon of a first end of the part and a second part coupon of a second end of the part.

Process 1400 inspects geometry of the number of contiguous coupons to produce inspection results (operation 1404). The inspection of the geometry is of features formed by the automated tool. In some illustrative examples, the inspection may be performed by physically inspecting geometry of the number of contiguous coupons.

In some illustrative examples, when processing the part having the number of contiguous coupons includes creating a number of holes in the number of contiguous coupons, inspecting the number of contiguous coupons comprises inspecting hole position using a check fixture. In these examples, inspecting hole position using the check fixture comprises placing a portion of the number of contiguous coupons around at least one pin of the check fixture. In some illustrative examples, inspecting the contiguous coupon comprises placing the number of contiguous coupons onto a plurality of check locations of a check fixture. In some illustrative examples, inspecting the number of contiguous coupons comprises inspecting exterior geometry of edges of the number of contiguous coupons.

Process 1400 validates the part using the inspection results (operation 1406). Afterwards the process terminates.

Figure 15:
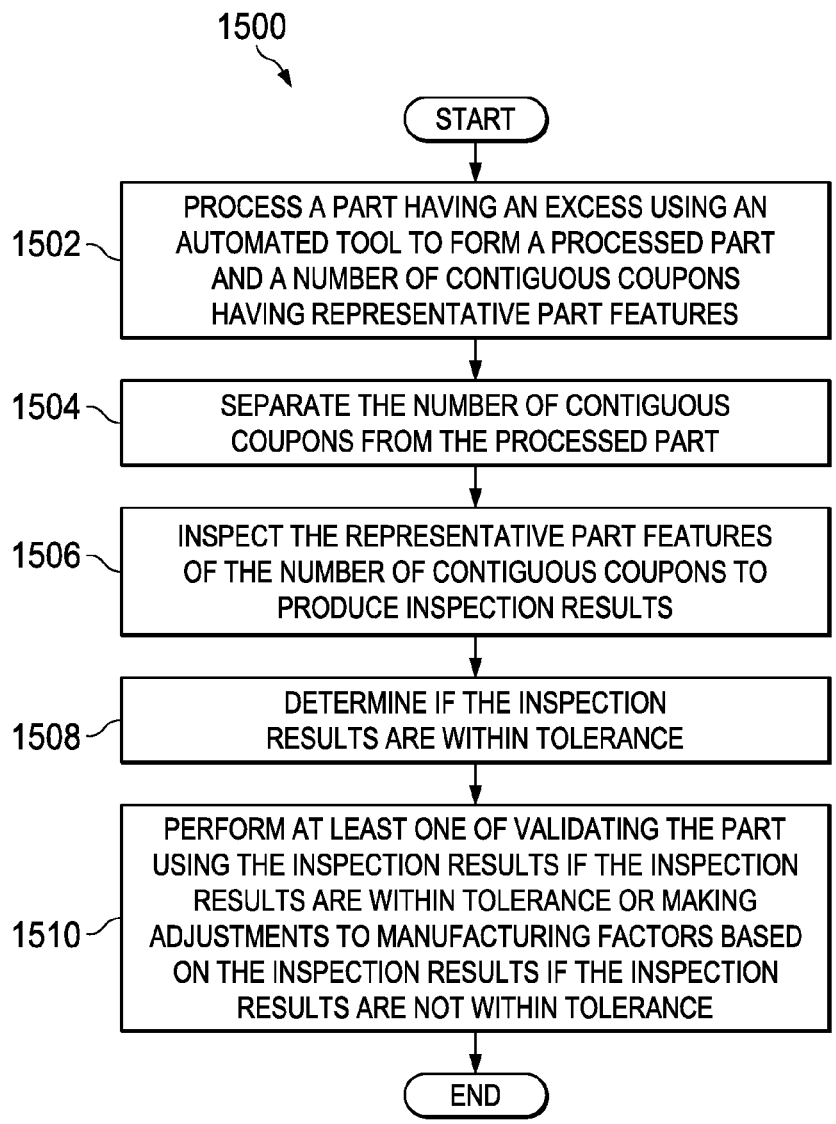
FIG. 15 is an illustration of a flowchart of a process for validating a part in accordance with an illustrative embodiment.

Turning now to FIG. 15, an illustration of a flowchart of a process for validating a part is depicted in accordance with an illustrative embodiment. Process 1500 may be used to validate part 100 of FIG. 1 or part 300 of FIG. 3.

Process 1500 processes a part having an excess using an automated tool to form a processed part and a number of contiguous coupons having representative part features (operation 1502). The representative part features are formed by the automated tool. For example, the representative part features may be formed using a numerically controlled milling operation. Process 1500 separates the number of contiguous coupons from the processed part (operation 1504).

Process 1500 inspects the representative part features of the number of contiguous coupons to produce inspection results (operation 1506). In some illustrative examples, inspecting geometry of the number of contiguous coupons inspects multiple axes of movement for the automated tool.

Process 1500 then determines if the inspection results are within tolerance (operation 1508). Process 1500 performs at least one of validating the part using the inspection results if the inspection results are within tolerance or making adjustments to manufacturing factors based on the inspection results if the inspection results are not within tolerance (operation 1510). The process terminates thereafter. In some illustrative examples, the manufacturing factors include at least one of a processing program for the numerically controlled tool, a holding fixture, or placement of the part on the holding fixture.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

In some illustrative examples, process 1400 of FIG. 14 further comprises separating the number of contiguous coupons from the part and trimming a number of tangs from the number of contiguous coupons while leaving a nominal machined edge of the contiguous coupon. In some illustrative examples, process 1400 further comprises measuring a diameter of a hole of the number of contiguous coupons using a metrology tool to form hole measurements, wherein validating the part also uses the hole measurements.

In other illustrative examples, inspecting the geometry of the number of contiguous coupons to produce inspection results comprises physically inspecting the number of contiguous coupons using a check fixture and process 1400 further comprises processing a second part having a second number of contiguous coupons using the automated tool, physically inspecting the second number of contiguous coupons using the check fixture to produce second inspection results, and validating the second part using the second inspection results. In these illustrative examples, the part and the second part may have different designs.

Figure 16:
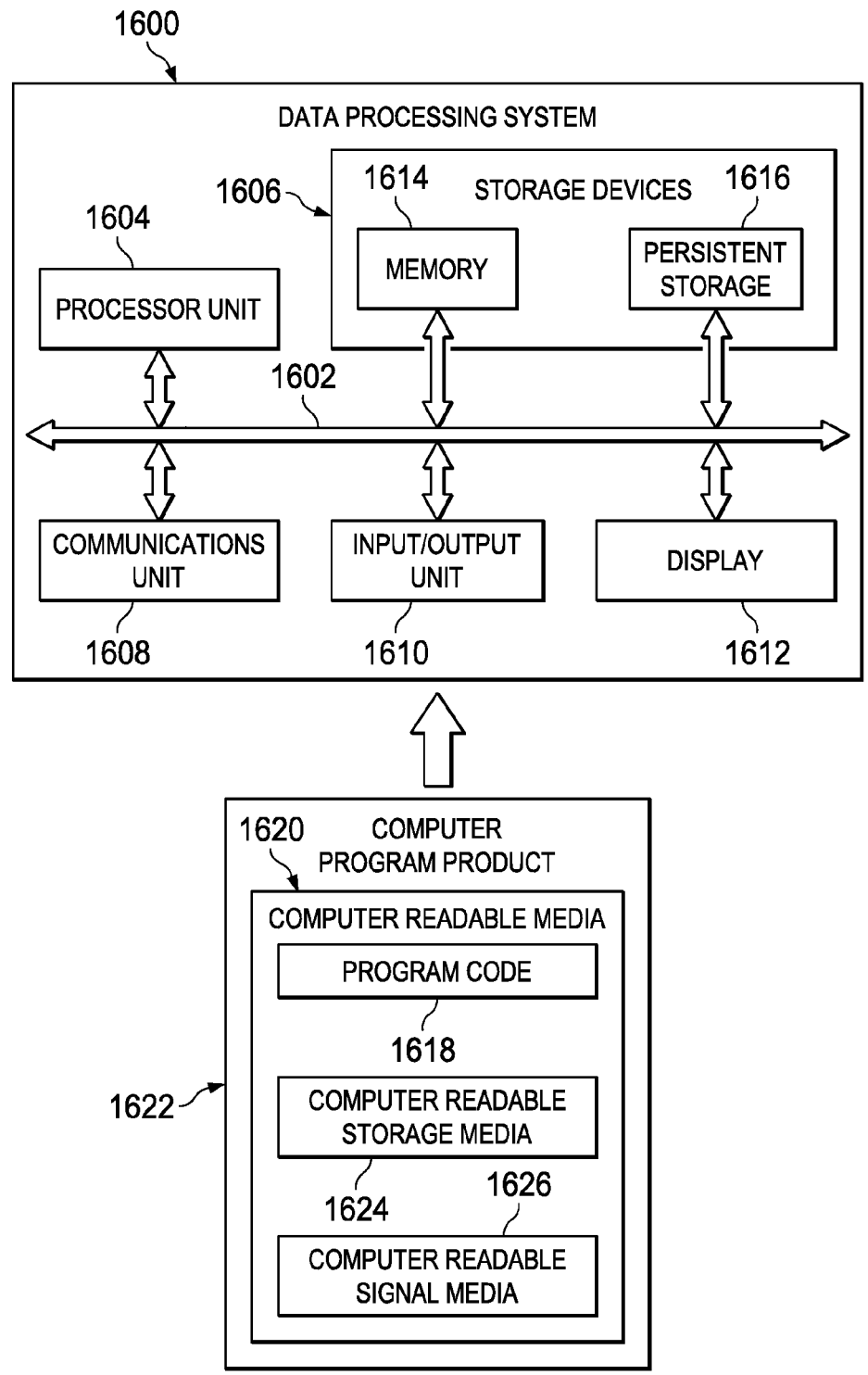
FIG. 16 is a data processing system in the form of a block diagram in accordance with an illustrative embodiment.

Turning now to FIG. 16, an illustration of a data processing system is depicted in the form of a block diagram in accordance with an illustrative embodiment. Data processing system 1600 may be used to implement a controller for numerically controlled tool 102 in FIG. 1. As depicted, data processing system 1600 includes communications framework 1602, which provides communications between processor unit 1604, storage devices 1606, communications unit 1608, input/output unit 1610, and display 1612. In some cases, communications framework 1602 may be implemented as a bus system.

Processor unit 1604 is configured to execute instructions for software to perform a number of operations. Processor unit 1604 may comprise a number of processors, a multi-processor core, and/or some other type of processor, depending on the implementation. In some cases, processor unit 1604 may take the form of a hardware unit, such as a circuit system, an application specific integrated circuit (ASIC), a programmable logic device, or some other suitable type of hardware unit.

Instructions for the operating system, applications, and/or programs run by processor unit 1604 may be located in storage devices 1606. Storage devices 1606 may be in communication with processor unit 1604 through communications framework 1602. As used herein, a storage device, also referred to as a computer-readable storage device, is any piece of hardware capable of storing information on a temporary and/or permanent basis. This information may include, but is not limited to, data, program code, and/or other information.

Memory 1614 and persistent storage 1616 are examples of storage devices 1606. Memory 1614 may take the form of, for example, a random access memory or some type of volatile or non-volatile storage device. Persistent storage 1616 may comprise any number of components or devices. For example, persistent storage 1616 may comprise a hard drive, a flash memory, a rewritable optical disk, a rewritable magnetic tape, or some combination of the above. The media used by persistent storage 1616 may or may not be removable.

Communications unit 1608 allows data processing system 1600 to communicate with other data processing systems and/or devices. Communications unit 1608 may provide communications using physical and/or wireless communications links.

Input/output unit 1610 allows input to be received from and output to be sent to other devices connected to data processing system 1600. For example, input/output unit 1610 may allow user input to be received through a keyboard, a mouse, and/or some other type of input device. As another example, input/output unit 1610 may allow output to be sent to a printer connected to data processing system 1600.

Display 1612 is configured to display information to a user. Display 1612 may comprise, for example, without limitation, a monitor, a touch screen, a laser display, a holographic display, a virtual display device, and/or some other type of display device.

In this illustrative example, the processes of the different illustrative embodiments may be performed by processor unit 1604 using computer-implemented instructions. These instructions may be referred to as a program code, a computer usable program code, or a computer-readable program code and may be read and executed by one or more processors in processor unit 1604.

In these examples, program code 1618 is located in a functional form on computer-readable media 1620, which is selectively removable, and may be loaded onto or transferred to data processing system 1600 for execution by processor unit 1604. Program code 1618 and computer-readable media 1620 together form computer program product 1622. In this illustrative example, computer-readable media 1620 may be computer-readable storage media 1624 or computer-readable signal media 1626.

Computer-readable storage media 1624 is a physical or tangible storage device used to store program code 1618, rather than a medium that propagates or transmits program code 1618. Computer-readable storage media 1624 may be, for example, without limitation, an optical or magnetic disk, or a persistent storage device that is connected to data processing system 1600.

Alternatively, program code 1618 may be transferred to data processing system 1600 using computer-readable signal media 1626. Computer-readable signal media 1626 may be, for example, a propagated data signal containing program code 1618. This data signal may be an electromagnetic signal, an optical signal, and/or some other type of signal that can be transmitted over physical and/or wireless communications links.

Figure 17:
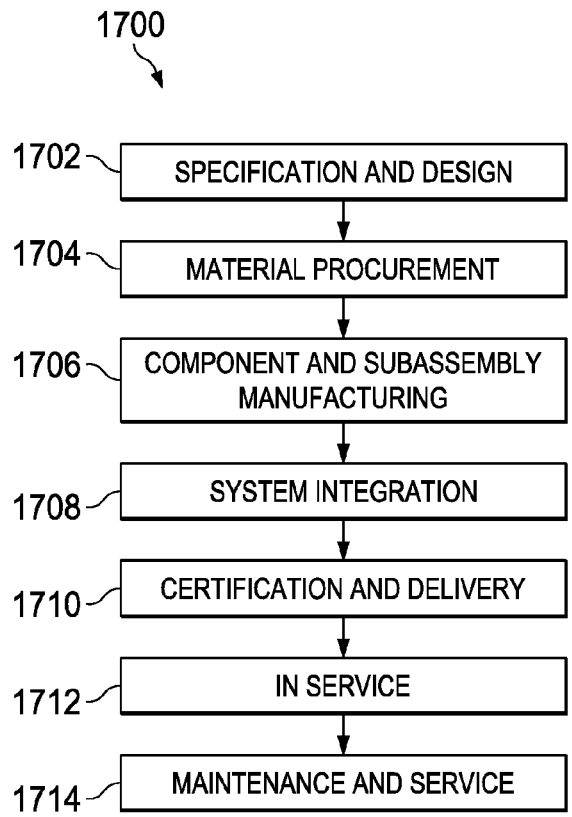
FIG. 17 is an illustration of an aircraft manufacturing and service method in the form of a block diagram in accordance with an illustrative embodiment.
Figure 18:
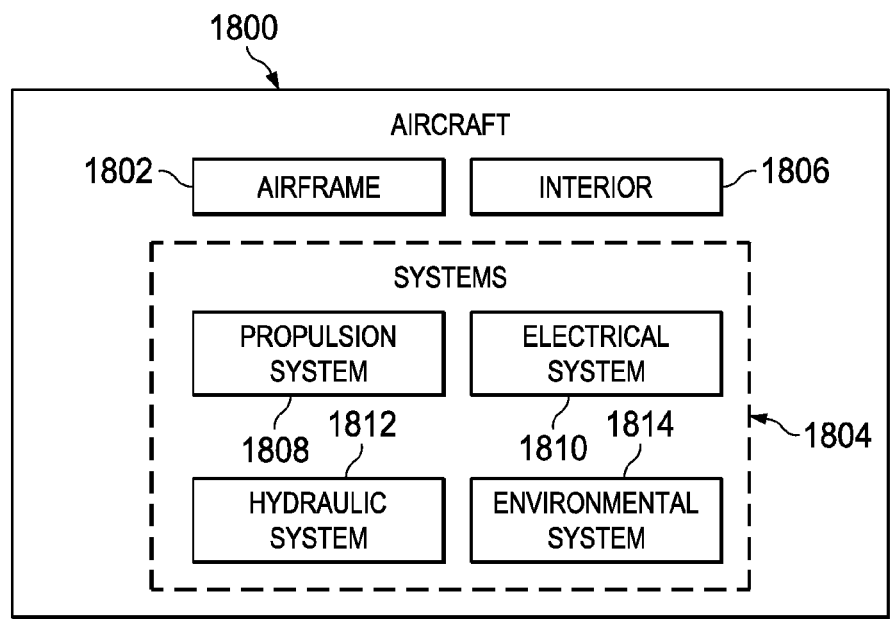
FIG. 18 is an illustration of an aircraft in the form of a block diagram in which an illustrative embodiment may be implemented.

Illustrative embodiments of the present disclosure may be described in the context of aircraft manufacturing and service method 1700 as shown in FIG. 17 and aircraft 1800 as shown in FIG. 18. Turning first to FIG. 17, an illustration of an aircraft manufacturing and service method is depicted in accordance with an illustrative embodiment. During preproduction, aircraft manufacturing and service method 1700 may include specification and design 1702 of aircraft 1800 in FIG. 18 and material procurement 1704.

During production, component and subassembly manufacturing 1706 and system integration 1708 of aircraft 1800 takes place. Thereafter, aircraft 1800 may go through certification and delivery 1710 in order to be placed in service 1712. While in service 1712 by a customer, aircraft 1800 is scheduled for routine maintenance and service 1714, which may include modification, reconfiguration, refurbishment, and/or other maintenance or service. Each of the processes of aircraft manufacturing and service method 1700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of an aircraft is depicted in which an illustrative embodiment may be implemented. In this example, aircraft 1800 is produced by aircraft manufacturing and service method 1700 in FIG. 17 and may include airframe 1802 with a plurality of systems 1804 and interior 1806. Examples of systems 1804 include one or more of propulsion system 1808, electrical system 1810, hydraulic system 1812, and environmental system 1814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1700. One or more illustrative embodiments may be used during component and subassembly manufacturing 1706 of FIG. 17. For example, number of contiguous coupons 122 of FIG. 1 may be used to validate parts during component and subassembly manufacturing 1706. In some examples, inspection results 130 of FIG. 1 may be reviewed during certification and delivery 1710 to confirm all parts are within tolerance. Number of contiguous coupons 122 may be used to validate a replacement part. In these examples, the validated replacement part may be used during maintenance and service 1714 of FIG. 17. Apparatuses and methods embodied herein may be employed to validate parts of at least one of airframe 1802, plurality of systems 1804, or interior 1806.

The illustrative embodiments provide a method and apparatus for validating a processed part. The method applies results from inspecting a number of contiguous coupons processed with a processed part to the processed part. Applying inspection results from a number of contiguous coupons to the processed part is an indirect way of determining if the processed part meets manufacturing tolerances.

The illustrative examples extract a product verification artifact, also referred to as a contiguous coupon from part excess, and inspect dimensional compliance using a check fixture. The contiguous coupon is representative of the numerically controlled tool and part indexing performance. The process uses the stability of numerical programs and tooling to apply the inspection results from the number of contiguous coupons to the processed part.

The illustrative processes may produce a flow time reduction for processed parts. In some illustrative examples, physical inspection and analysis of contiguous coupons may use 75% less time than waiting for, performing, and analyzing laser metrology of the processed part.

Check fixtures take up less space and have a lower overhead cost than laser metrology tools. Further, a plurality of check fixtures may be present. With multiple check fixtures, an operator may not need to wait for tool availability. With a plurality of check fixtures, validating the processed part may no longer present a bottleneck to the manufacturing process.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
    processing a part having a number of contiguous coupons using an automated tool;
    inspecting geometry of the number of contiguous coupons to produce inspection results; and
    validating the part using the inspection results.

2. The method of claim 1, wherein processing the part having the number of contiguous coupons includes creating a number of holes in the number of contiguous coupons.

3. The method of claim 2, wherein inspecting geometry of the number of contiguous coupons comprises inspecting hole position using a check fixture.

4. The method of claim 3, wherein inspecting hole position using the check fixture comprises placing a portion of the number of contiguous coupons around at least one pin of the check fixture.

5. The method of claim 1, wherein inspecting geometry of the number of contiguous coupons comprises placing the number of contiguous coupons onto a plurality of check locations of a check fixture.

6. The method of claim 1, wherein inspecting the number of contiguous coupons comprises inspecting exterior geometry of edges of the number of contiguous coupons.

7. The method of claim 1 further comprising:
    separating the number of contiguous coupons from the part; and
    trimming a number of tangs from the number of contiguous coupons while leaving a nominal machined edge of each contiguous coupon.

8. The method of claim 1, wherein inspecting the geometry of the number of contiguous coupons to produce inspection results comprises physically inspecting the number of contiguous coupons using a check fixture, the method further comprising:
    processing a second part having a second number of contiguous coupons using the automated tool;
    physically inspecting the second number of contiguous coupons using the check fixture to produce second inspection results; and
    validating the second part using the second inspection results.

9. The method of claim 8, wherein the part and the second part have different designs.

10. The method of claim 1 further comprising:
    measuring a diameter of a hole of the number of contiguous coupons using a metrology tool to form hole measurements, wherein validating the part also uses the hole measurements.

11. The method of claim 1, wherein the number of contiguous coupons comprises a first contiguous coupon of a first end of the part and a second contiguous coupon of a second end of the part.

12. A method comprising:
    processing a part having an excess using an automated tool to form a processed part and a number of contiguous coupons having representative part features;
    separating the number of contiguous coupons from the processed part;
    inspecting the representative part features of the number of contiguous coupons to produce inspection results;
    determining if the inspection results are within tolerance; and
    performing at least one of validating the part using the inspection results if the inspection results are within tolerance or making adjustments to manufacturing factors based on the inspection results if the inspection results are not within tolerance.

13. The method of claim 12, wherein inspecting the representative part features of the number of contiguous coupons inspects multiple axes of movement for the automated tool.

14. The method of claim 12, wherein the manufacturing factors include at least one of a processing program for the automated tool, a holding fixture, or placement of the part on the holding fixture.

15. A check fixture for validation of geometric features of a part, the check fixture comprising:
    a plurality of check locations for physical verification of geometry of a number of contiguous coupons processed with the part, wherein the plurality of check locations validates a plurality of representative part features.

16. The check fixture of claim 15, wherein the plurality of check locations comprises a cutout for verifying an outer dimension of the number of contiguous coupons.

17. The check fixture of claim 15, wherein the plurality of check locations comprises a pin configured to verify a hole position of the number of contiguous coupons.

18. The check fixture of claim 15, wherein the plurality of check locations comprises a ledge configured to verify a hole position of the number of contiguous coupons.

19. The check fixture of claim 15, wherein the plurality of check locations comprises pins configured to verify hole spacing of the number of contiguous coupons.

20. The check fixture of claim 15, wherein the plurality of check locations comprises eight check locations.

21. A part validation system comprising:
- an automated tool configured to process a part having a number of contiguous coupons;
- an inspection tool configured to inspect geometry of the number of contiguous coupons to produce inspection results; and
- a computer system configured to validate the part using the inspection results.

22. The part validation system of claim 21, wherein the computer system attributes the inspection results from the number of contiguous coupons to the part.

* * * * *